United States Patent [19]

Levecque et al.

[11] 4,145,203

[45] Mar. 20, 1979

[54] APPARATUS FOR FORMING FIBERS FROM ATTENUABLE MATERIAL

[75] Inventors: Marcel Levecque, Birchrunville, Pa.; Jean A. Battigelli; Dominique Plantard, both of Rantigny, France

[73] Assignee: Saint-Gobain Industries, Neuilly-sur-Seine, France

[21] Appl. No.: 834,540

[22] Filed: Sep. 19, 1977

Related U.S. Application Data

[63] Continuation-in-part of Ser. No. 676,755, Apr. 14, 1976, and a continuation-in-part of Ser. No. 762,789, Jan. 25, 1977, which is a continuation-in-part of Ser. No. 557,282, Mar. 11, 1975, Pat. No. 4,015,964, which is a continuation-in-part of Ser. No. 353,984, Apr. 24, 1973, Pat. No. 3,885,940.

[30] Foreign Application Priority Data

Aug. 23, 1977 [FR] France .................................. 77 25690

[51] Int. Cl.$^2$ ............................................. C03B 37/04
[52] U.S. Cl. ............................................. 65/16; 65/5; 264/12; 425/7
[58] Field of Search ................. 65/2, 5, 12, 16; 425/7; 264/12

[56] References Cited

U.S. PATENT DOCUMENTS

| 2,189,822 | 2/1940 | Thomas et al. | 65/5 |
| 3,732,595 | 5/1973 | Marshall | 65/16 |
| 3,874,886 | 4/1975 | Levecque et al. | 65/16 X |

FOREIGN PATENT DOCUMENTS

| 307637 | 1/1969 | Sweden | 65/5 |
| 283532 | 1/1971 | U.S.S.R. | 65/5 |
| 528270 | 9/1976 | U.S.S.R. | 65/16 |

*Primary Examiner*—Robert L. Lindsay, Jr.
*Attorney, Agent, or Firm*—John T. Synnestvedt; Kenneth P. Synnestvedt

[57] ABSTRACT

Equipment is disclosed for developing high velocity gas blasts or jets arranged to effect fiber formation from attenuable material, such as molten glass. Preferably the apparatus is arranged to effect the attenuation in two stages, each of which utilizes a pair of high velocity whirling currents or tornadoes, with the gas in the two tornadoes of each pair turning in opposite directions and merging in the downstream direction, means for supplying the attenuable material being arranged to deliver a stream of the material into the influence of the tornadoes upstream of the point of confluence.

20 Claims, 16 Drawing Figures

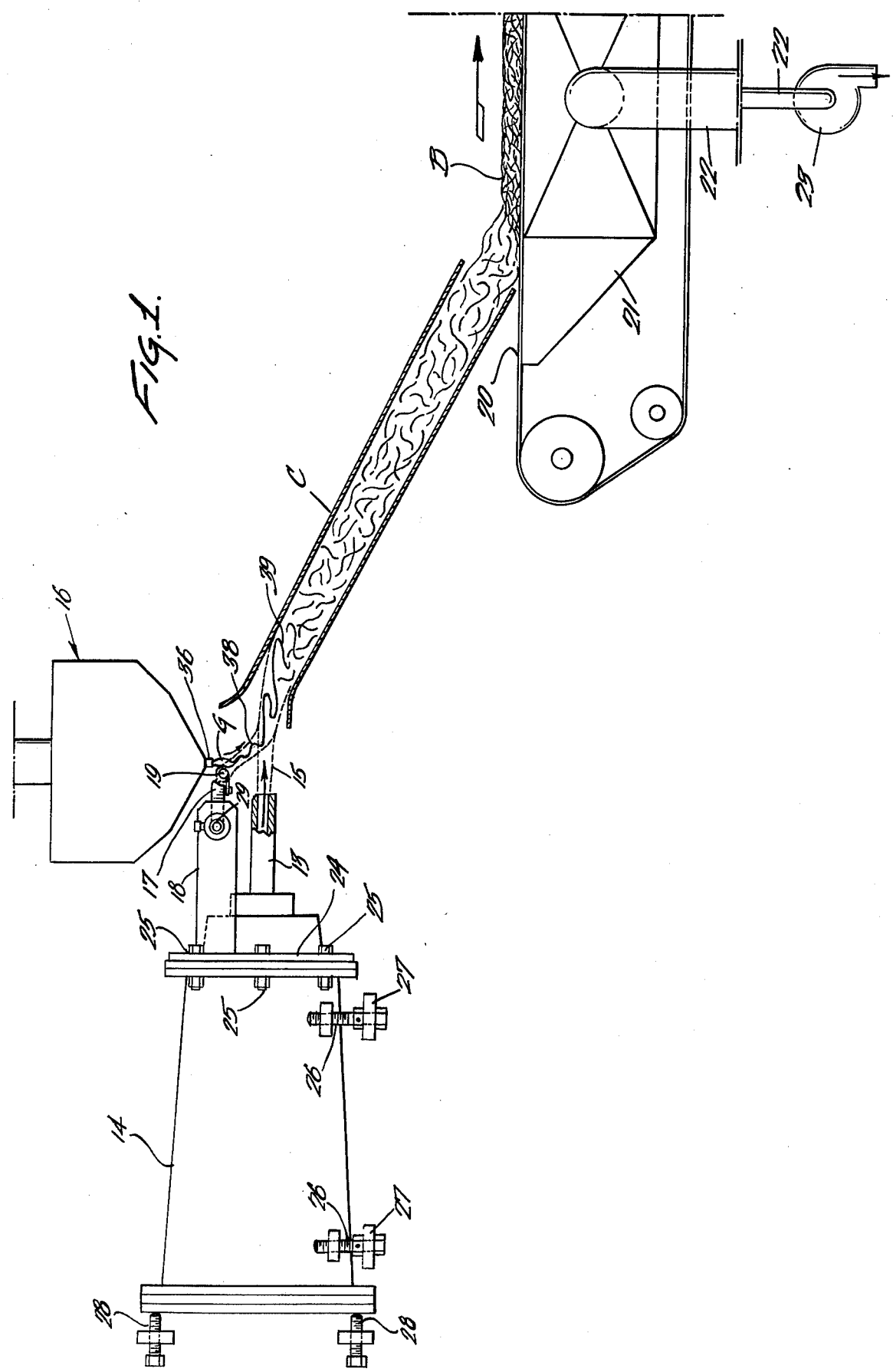

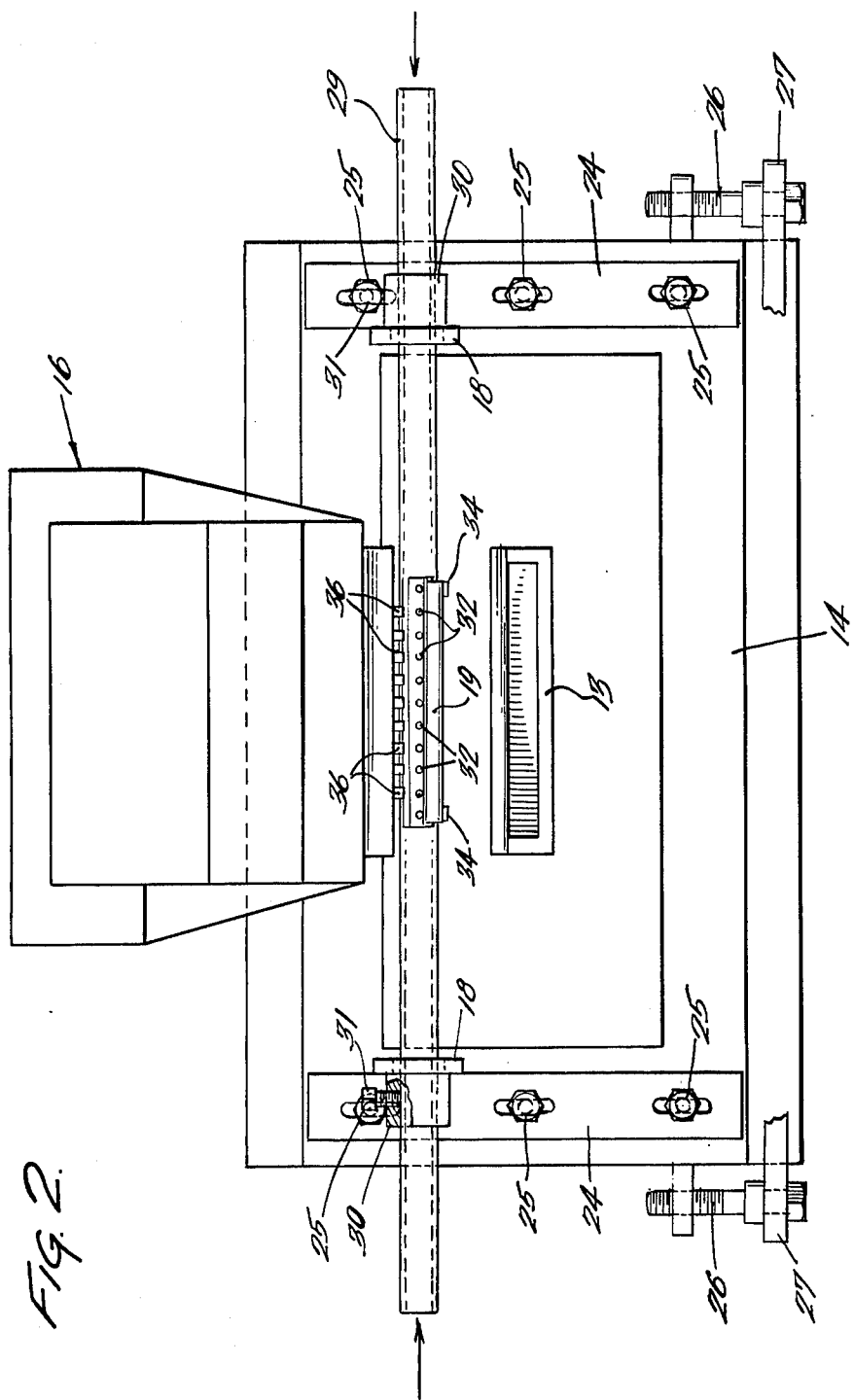

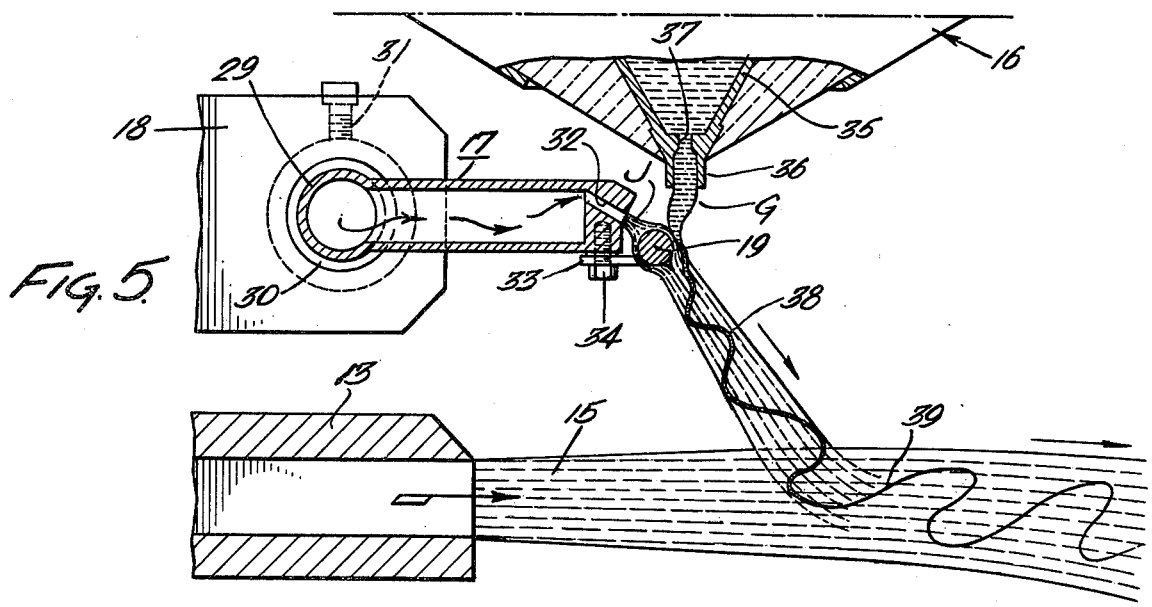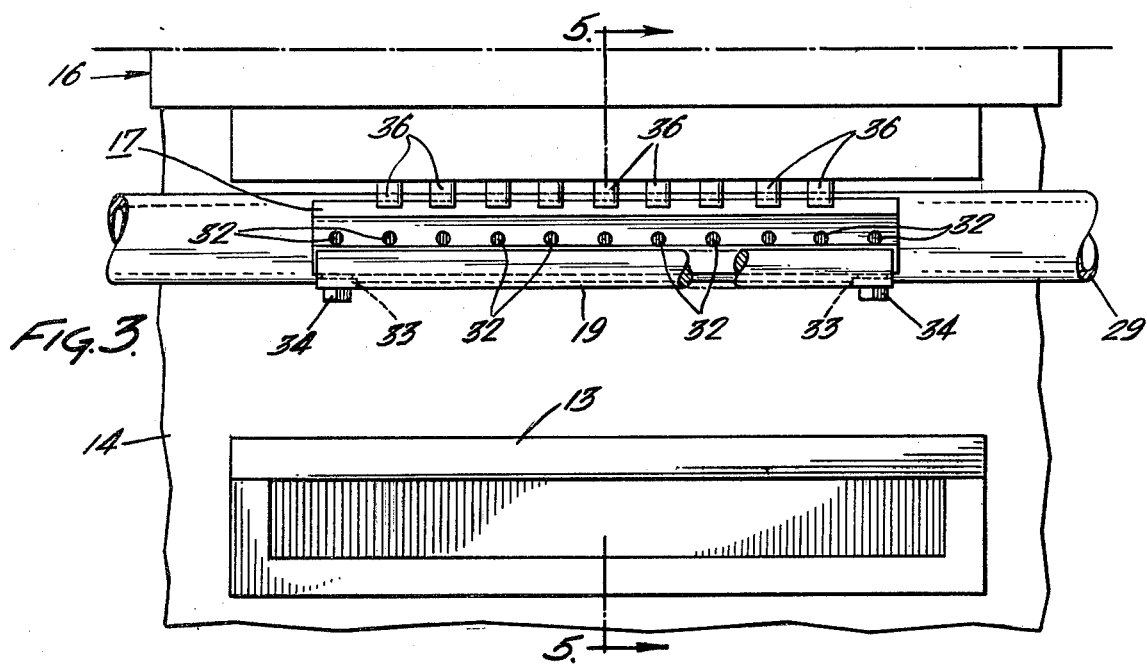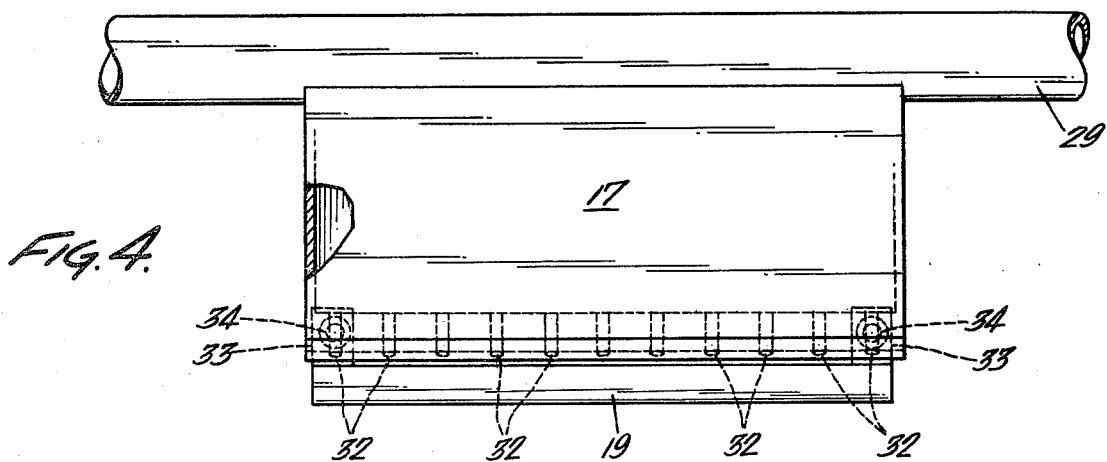

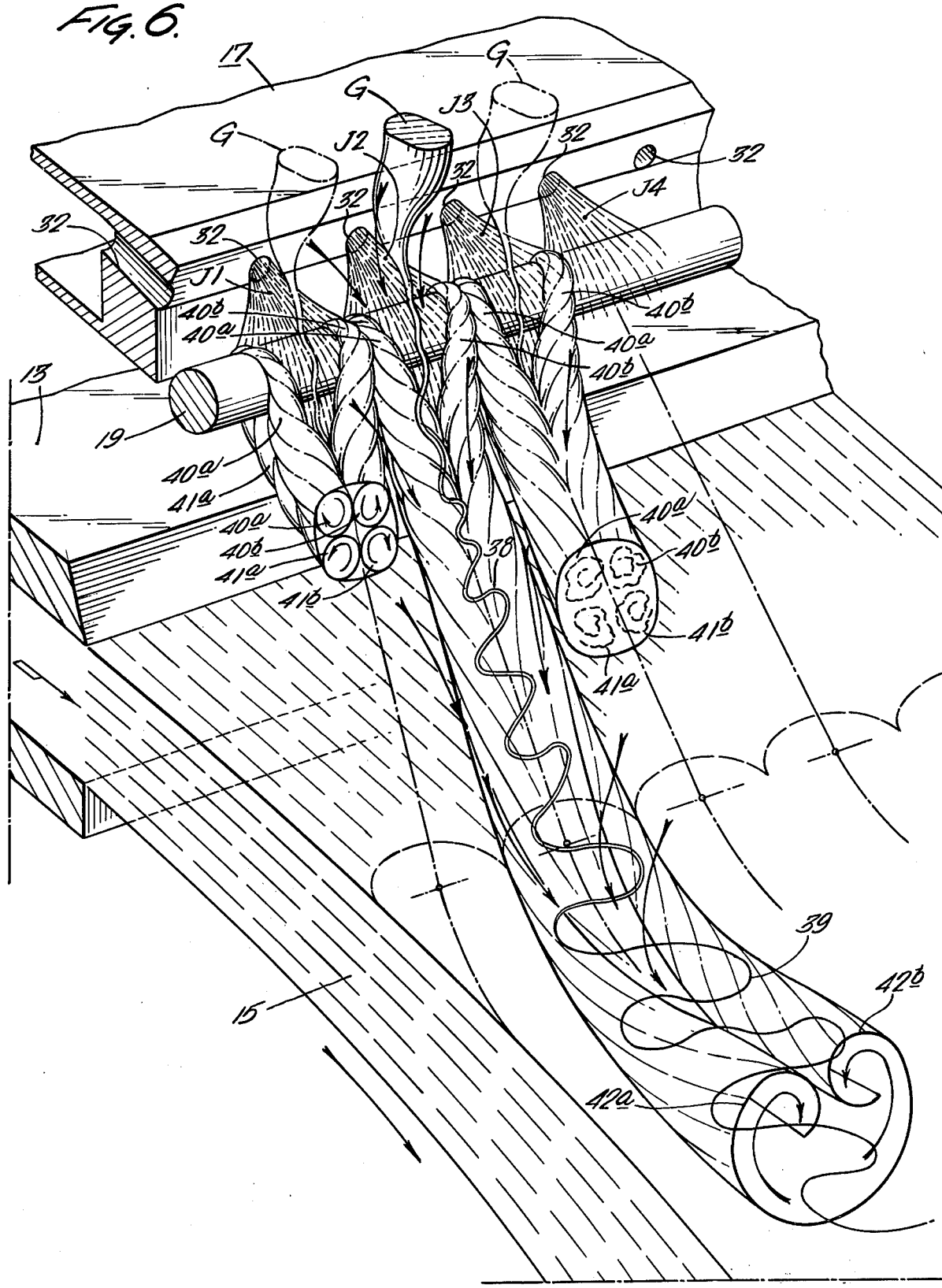

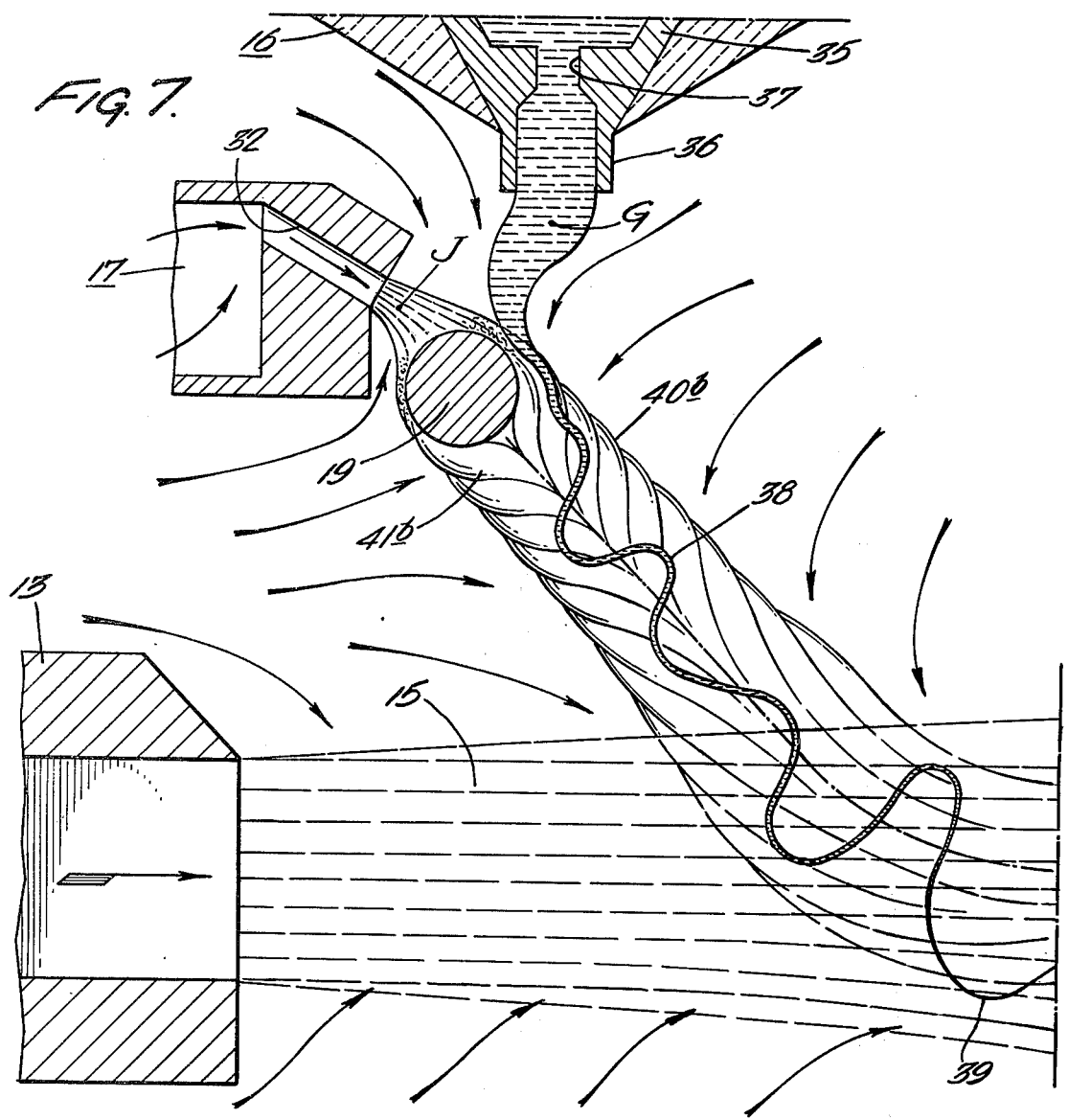
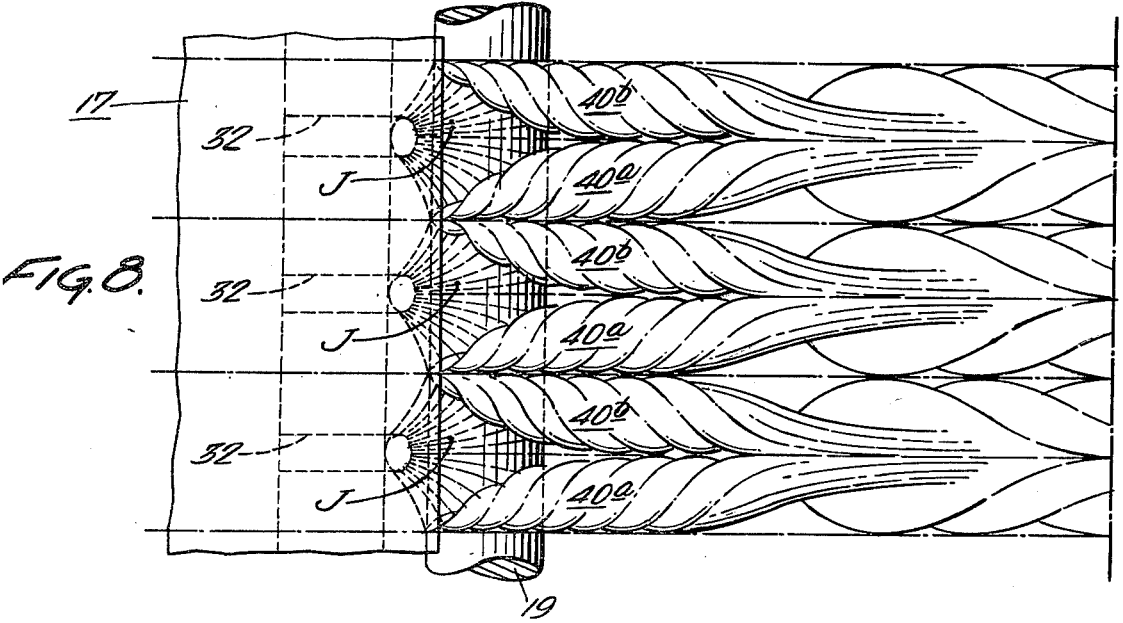

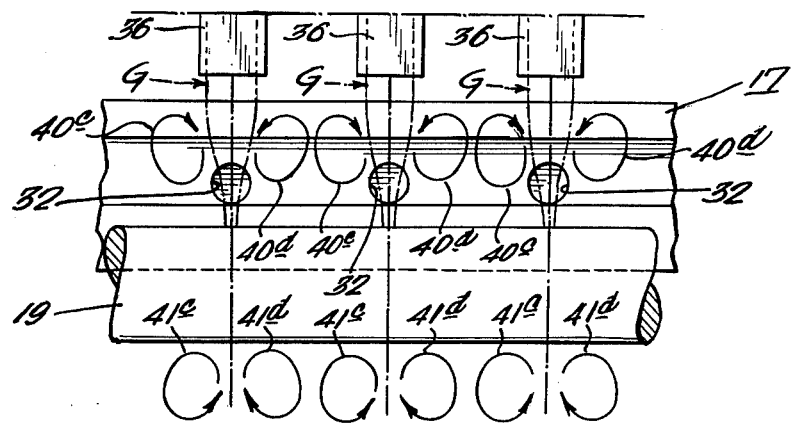
FIG. 9.
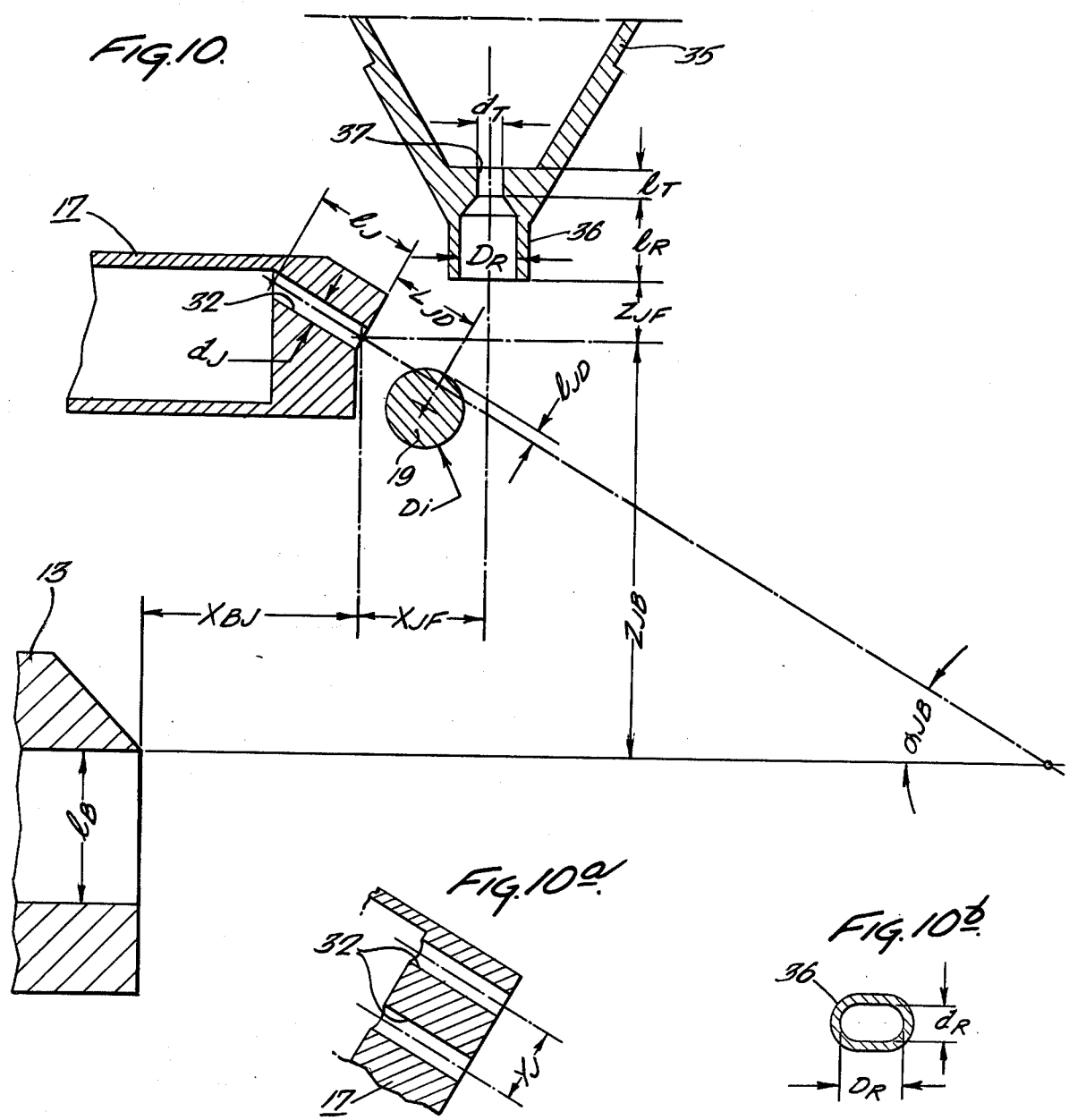
FIG. 10.
FIG. 10a.
FIG. 10b.

APPARATUS FOR FORMING FIBERS FROM ATTENUABLE MATERIAL

CROSS REFERENCES

The present application is a Continuation-in-part of our applications Ser. No. 676,755, filed Apr. 14, 1976, and Ser. No. 762,789, filed Jan. 25, 1977, which in turn are Continuations-in-part of our application Ser. No. 557,282, filed Mar. 11, 1975, now issued as U.S. Pat. No. 4,015,964, which, in its turn, is a Continuation-in-part of our application 353,984, filed Apr. 24, 1973, and now issued as U.S. Pat. No. 3,885,940.

BACKGROUND AND OBJECTS

This invention relates to the formation of fibers from attenuable material and while the invention is adapted for use in the formation of fibers from a wide variety of attenuable materials, it is particularly suited to the attenuation of various thermoplastic materials, especially mineral materials such as glass and similar compositions which are rendered molten by heating. As with the technique of the prior application Ser. No. 762,789, the present invention may be employed in connection not only with various mineral materials, but also with certain organic materials which are attenuable, such as polystyrene, polypropylene, polycarbonate and polyamides. Since the equipment or apparatus is especially useful in the attenuation of glass and similar thermoplastic materials, the following description refers to the use of glass by way of illustration.

Certain techniques for utilizing whirling currents or tornadoes for the attenuation of molten glass have been disclosed by us in prior applications above identified, such techniques being identified as toration. For example, U.S. Pat. No. 3,885,940, above identified, and also the companion U.S. Pat. No. 3,874,886, disclose development of pairs of counter-rotating tornadoes by directing a gaseous jet into a larger gaseous blast, thereby creating a zone of interaction including pairs of such tornadoes, and into which zone a stream of molten glass is delivered, with resultant attenuation of the glass stream.

In the equipment illustrated in said prior U.S. patents, the orifice from which the glass stream is delivered to the zone of interaction is located at or adjacent to the boundary of the blast. In our prior application Ser. No. 557,282, toration arrangements are disclosed in which the glass orifice is positioned in spaced relation to the boundary of the blast, and in which the glass stream is delivered by gravity to the zone of interaction established by the interaction of a jet and a larger blast.

In prior applications Ser. Nos. 762,789, and 676,755, both the glass orifices and the jet orifices are spaced from the boundary of the blast, and the glass streams are delivered by the action of the jets into zones of interaction of the jets with the blast. In the applications just mentioned, the glass streams are also subjected to two stages of attenuation, one stage occurring in the jet and the other in the blast.

Still further in our application Ser. No. 762,789, the secondary or carrier jet which delivers the glass into the zone of interaction with the blast is caused to develop a stable zone of laminar flow lying between a pair of counter-rotating whirls or tornadoes, and the glass stream is delivered to the laminar zone and thereafter enters the region of the tornadoes of the carrier jet, which latter merge downstream of the carrier jet, but before the carrier jet reaches the principal blast. As is pointed out in our application Ser. No. 762,789, the operation just described results in a two-stage attenuation, the first stage taking place as the glass stream is advanced into the influence of the tornadoes of the carrier jet, and the second stage taking place after the carrier jet and the partially attenuated stream enters the zone of interaction of the carrier jet with the blast.

According to the disclosure of said application Ser. No. 762,789, the zone of laminar flow and the tornadoes of the carrier jet are developed as a result of disturbance and deflection of the carrier jet and, as further brought out, such deflection of the carrier jet contributes stability of operation, notwithstanding the delivery of the glass to the carrier jet at a point spaced from the principal blast. Numerous other advantages of this arrangement are also pointed out in application Ser. No. 762,789.

The present invention in common with application Ser. No. 762,789, contemplates employment of orifices for the carrier jet and for the glass stream which are spaced from the principal jet, and further contemplates the employent of means for guiding or deflecting the carrier jet and for development of a zone of laminar flow as well as pairs of tornadoes in the jet flow. However, according to the present invention, the equipment or means for deflecting the carrier jet and for developing the tornadoes and the laminar zone takes a different form from that disclosed in our prior application Ser. No. 762,789, as will be fully described hereinafter.

Some of the major objectives of the present invention include the stabilization of the glass feed, notwithstanding substantial separation of the glass delivery orifice from the attenuating blast and from the zone of interaction of the carrier jet with the blast. The jet guiding or deflecting means of the present invention provides for local deflection of the jet flow and usually for deflection of the overall jet flow path. Although it is preferred to employ the jet guiding or deflecting means, with the resultant tornadoes in the jet flow, as a means for delivering the stream of glass into the zone of interaction with the principal blast, and thus effect a two-step attenuation, it is also contemplated that the tornadoes of the carrier jet may be utilized as a single stage attenuation. In this event, the principal blast is not required, since the toration in the zone of interaction between the jet and blast would not then be utilized.

More specifically, the present invention contemplates the employment of a guiding or deflecting means for the secondary or carrier jet, in the form of a structure or element having a convexly curved surface positioned in the path of the jet and causing deflection of the jet flow at least in part by a Coanda effect, all as will appear more fully hereinafter in the description of the two embodiments illustrated in the accompanying drawings.

BRIEF DESCRIPTION OF THE DRAWINGS

In the drawings, FIGS. 1 to 10b inclusive illustrate one embodiment, and in these Figures FIG. 1 is a somewhat diagrammatic elevational view of the major fiber producing and fiber collecting components of a system according to one embodiment of the invention, with certain parts shown in vertical section;

FIG. 2 is an enlarged elevational view of the major fiber producing components shown in FIG. 1, this view being taken from the right of FIG. 1, but with the fiber collecting components removed;

FIG. 3 is a further enlarged elevational view of certain portions of the equipment shown in FIG. 2;

FIG. 4 is a plan view of some of the components shown in FIG. 3;

FIG. 5 is a vertical sectional view of the fiber producing components illustrated in FIGS. 3 and 4, this view being taken on section line 5—5 in FIG. 3;

FIG. 6 is a perspective diagrammatic view illustrating the operation of the equipment shown in FIGS. 1 to 5 inclusive;

FIG. 7 is a cross sectional fragmentary somewhat diagrammatic and further enlarged view of the equipment shown in FIG. 5, and illustrating certain phases of the activity of the jet deflecting means of the present invention, in effecting attenuation of the glass;

FIG. 8 is a somewhat diagrammatic view of several jets and of portions of the blast shown in FIG. 7, but omitting the glass feed and glass fibers being formed;

FIG. 9 is a transverse sectional diagram through portions of several adjacent jets, and illustrating directions of rotation of certain pairs of the counter-rotating tornadoes;

FIG. 10 is a fragmentary sectional view of the major components of the fiberizing system, particularly illustrating certain dimensions to be taken into account in establishing operating conditions in accordance with the preferred practice of the present invention;

FIG. 10a is a fragmentary sectional view indicating spacing between a pair of adjacent jet orifices; and FIG. 10b is a transverse sectional view through a portion of the delivery means for the attenuable material, also indicating certain dimensions to be taken into account.

FIG. 11 is a fragmentary perspective diagrammatic view similar to FIG. 6 but illustrating an alternative form of the jet deflecting means;

FIG. 12 is a fragmentary sectional view of the major fiberizing components of the embodiment of FIG. 11, particularly illustrating certain dimensions to be taken into account in establishing the desired operating conditions;

FIG. 12b is a view similar to FIG. 10b.

DETAILED DESCRIPTION

Figure 11:
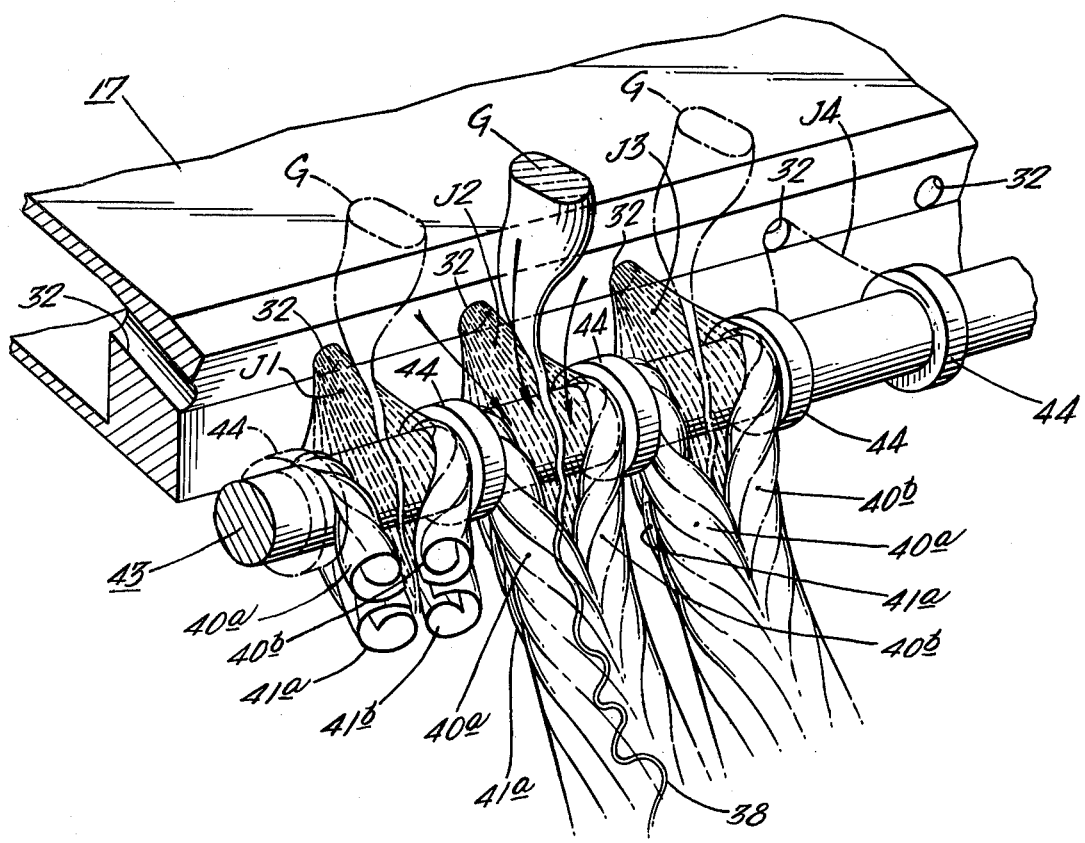
FIGS. 11 to 12b inclusive illustrate another embodiment, and in these Figures

Turning first to the embodiment of the invention of FIGS. 1 to 10b attention is first directed to the overall outline view of FIG. 1. A blast delivery means is indicated at 13, this device being associated with the burner or blast generator 14. The principal jet or blast 15 is delivered from the device 13 in a generally horizontal direction below a glass supply means indicated in outline at 16. Secondary or carrier jets are delivered from nozzles or orifices associated with the gas supply means 17 which is mounted upon brackets 18. The secondary jets are directed toward the deflector element indicated at 19 and the carrier jets are thereby deflected in a downward direction to penetrate the blast 15 and develop zones of interaction. Individual streams of glass are supplied from the supply means 16 and these streams, are delivered to the secondary jets and are carried thereby into the zone of interaction with the blast, with resultant fiberization. The merged current of the jets and blast, together with the attenuated fibers enter the guide or chute C which is inclined downwardly toward the right as viewed in FIG. 1 for delivery of the fibers onto the surface of a perforate fiber collecting belt or conveyor 20. Suction boxes such as indicated at 21 are advantageously located below the upper run of the conveyor 20 and by means of ducts and fans diagrammatically indicated at 22 and 23, the fibers are collected in the form of a blanket indicated at B.

Brackets 18 for mounting the secondary jets are connected with mounting straps 24 having slotted apertures cooperating with bolts 25 providing for vertical adjustment of the brackets 18 with respect to the main body of the blast generator 14, thereby providing for relative vertical adjustment of the jet mounting brackets and thus of the jets, with respect to the blast generator and thus of the blast 15 itself.

Preferably also, the main body of the blast generator 14 and thus also the jet mounting brackets 18 and jets, are mounted for vertical adjustment by means of screw jacks indicated at 26 associated with fixed structure 27. By this means, the blast and the jet producing devices may be conjointly moved in the vertical direction and thereby provide for vertical adjustment with respect to the glass supply means 16 and the fiber directing duct C. Still further, the horizontal position of this entire assembly of parts may be adjusted by means of suitable jack screw devices diagrammatically indicated at 28. Provision is further made for certain other adjustments of parts associated with the jet generators and the jet deflectors, as will be described thereinafter with reference to some of the enlarged figures.

Turning now to the enlarged illustration of the fiberizing components as shown in FIGS. 2, 3, 4 and 5, it is first noted that the means indicated at 17 for supplying gas to the secondary jets is mounted by means of the gas supply tube 29 which is supported by means of sockets 30 which, in turn, are connected with the brackets 18. In this way, the jet supply device 17 may be angularly shifted upwardly or downwardly about the axis of the tube 29 and may be fixed in any desired position, for instance by set screws such as indicated at 31.

In addition to this angular upward and downward movement of the jet supply device 17, the mounting arrangement just described also provides for lateral shifting movement or adjustment of the device 17 in a direction paralleling the axis of the supporting tube 29. This adjustment is of importance in order to provide for accurate alignment of the carrier jets with respect to the glass orifices to be described hereinafter.

The device 17, in effect, comprises a manifold for feeding the individual jet orifices indicated at 32, there being 11 of such orifices in the embodiment here illustrated. As clearly appears in FIGS. 5, the jet orifices have their axes inclined downwardly to the right toward the surface of the deflector 19. In this embodiment, the deflector 19 takes the form of a cylindrical rod having a surface convexly curved about an axis transverse to the streams of attenuable material. This rod has mounting tabs 33 secured to opposite ends thereof and connected with the body of the jet supply manifold 17 by means of bolts 34. The vertical position of the deflecting rod 19 with relation to the jet supply manifold 17 and thus in relation to the jets, may be adjusted by the insertion or removal of shims between the mounting tabs 33 and the bottom of the manifold 17. In addition, the apertures in the tabs 33 may be of elongated shape, to provide for adjustment of the position of the deflector rod in a horizontal direction.

The glass supply means 16 includes a bushing 35 with a series of glass delivery devices 36, each of which is fed by a metering orifice 37. The glass is thus supplied in a series of streams or glass bulbs G to the secondary jets in which the streams are partially attenuated, as indicated at 38 in FIG. 5, and the partially attenuated streams enter the zone of interaction of the jets with the blast, with resultant additional attenuation as indicated at 39 in FIG. 5. From FIG. 3, it will be observed that there are nine glass delivery devices 36, and that the total number (eleven) of jet orifices 32 is greater than the number of glass delivery orifices so that an "outboard" jet may be positioned at each end of the series, in order to provide uniform fiberizing conditions for each of the nine glass streams employed in this embodiment.

The fiberizing operation provided by the equipment described above in relation to FIGS. 1 to 5 is illustrated schematically in FIGS. 6, 7, 8 and 9. In considering these figures, it is first pointed out that the cylindrical deflector or rod 19 is shown as positioned with its axis offset somewhat downwardly from the axes of the individual secondary jets J delivered from the jet orifices 32. This positioning is clearly shown in FIG. 7 and from FIG. 6 this relation also appears in connection with each of a series of four of the secondary jets J1, J2, J3 and J4. As best seen in FIG. 7, the flow of each of the carrier jets J is divided into upper and lower portions, the upper portion flowing around the upper surface of the rod 19 and the lower portion around the lower surface of the rod 19. Where the jets first impinge upon the surface of the rod 19, the surface of the rod acts to spread the jet flow and as the jet flow passes beyond the mid regions of the rod the jet flow is influenced by a Coanda effect, causing the jet flow to follow the surface of the rod. This brings the two divided portions of the jet flow together again, as clearly appears in FIG. 7.

In the embodiment as shown, the center of the rod 19 is positioned below the axis of the jet orifices, and because of this, the upper portion of the jet flow is of larger section than the lower portion, and this is desirable for reasons which will appear as this description proceeds. The portions of the secondary jet flow above and below the rod 19 merge with each other in a position toward the side of the rod 19 generally opposite to the jet orifice 32. In the embodiment as shown, the offset of the rod below the axes of the jets results in downward deflection of the overall jet flow path. It is also possible to position the rod with its axis in direct alignment with the axes of the jets, in which case the jet flow will leave the rod in a direction aligned with the axes of the jets.

As best seen in FIGS. 6 and 8, the jet flow from each of the orifices 32 also spreads laterally or diverges in the axial direction of the deflector 19, and with appropriate spacing of the jets, the lateral spreading or divergence results in impingement of adjoining jets upon each other, and this occurs as the upper and lower portions of the jets flow around the upper and lower surfaces of the rod 19.

This lateral impingement of the adjoining jets upon each other results in the development of pairs of counter-rotating whirls or tornadoes which have their points of origin or apices at the surface of the rod 19. As will be seen from FIGS. 6 to 9, two pairs of tornadoes develop from the flow of each jet. Thus, an upper pair 40a and 40b develop from the portion of the jet flow which passes over the upper surface of the rod 19, and a lower pair 41a and 41b develop from the portion of the jet flow which passes under the lower surface of the rod 19. Each of these pairs of tornadoes are counter-rotating, the directions of rotation of the upper pair being downwardly at their adjoining sides and upwardly at their outer sides, as indicated by the arrows 40c and 40d in FIG. 9. On the other hand, the directions of rotation of the tornadoes of the lower pair is upwardly at their adjoining sides and downwardly at their outer sides, as indicated by the arrows 41c and 41d in FIG. 9.

Because of the positioning of the guide rod 19 in offset relation to the axes of each jet, the portion of the flow with the resultant tornadoes above the rod is larger and therefore more effective than the portion of the flow and tornadoes below the rod.

The rod 19 acts to develop areas of substantially laminar flow on the upper side of the rod between the upper pair of tornadoes 40a and 40b of each jet. Each of these areas of laminar flow is generally triangular in shape, because the upper pair of tornadoes increase in size in the downstream direction of the flow. Indeed, the upper pair of tornadoes increase in size until they merge, as is clearly indicated in FIGS. 6 and 8. The lower pair of tornadoes also increase in size and ultimately merge, as will be apparent in FIG. 6 from the tornadoes illustrated as associated with the jet J1. As the jet flow including the associated tornadoes progresses still further, the tornadoes tend to lose their identity, as is indicated by the section of the jet flow originating from the jet J3 in FIG. 6. The merged flow of each jet, including the pairs of tornadoes originating with that jet, retain sufficient kinetic energy per unit of volume in relation to the kinetic energy of the principal blast, to cause penetration of the principal blast 15, and this penetration of the blast by each jet creates a zone of interaction of the type fully explained in our issued U.S. Pat. No. 3,885,940 above identified. Such a zone of interaction is characterized by the development of a pair of counter-rotating whirls or tornadoes 42a and 42b (see FIG. 6). Indeed, in the region of penetration of the jets into the blast, the flow and velocity of each jet is still sufficiently concentrated near the center of each jet so that each jet acts individually to develop a zone of interaction in the blast.

The flow of the secondary jets J1, J2, etc. is utilized to effect fiber formation, from the streams of the attenuable material, such as glass. The feed of this material is effected by the development of glass bulbs such as indicated at G, which are discharged from the devices 36, and from which individual streams of glass are delivered into the laminar flow areas of the jets lying between the pairs of upper tornadoes, as is clearly shown in FIG. 6. Because of the flow characteristics in this region above the guide rod 19, a very substantial air induction occurs, as is indicated by the arrows in FIG. 6 in association with the flow of jet J2 and also as indicated in FIG. 7. The induced air assists in drawing a stream of the glass from each glass bulb G and delivering that stream in a stable manner into the zone of laminar flow between the pair of tornadoes of each fiberizing center. The whirling currents of the tornadoes then advance the stream and initiate the attenuation thereof, as is indicated at 38 in FIGS. 5, 6 and 7.

The partially attenuated fiber, together with the jet flow, then progresses downwardly to penetrate the blast 15 and thereby deliver the partially attenuated fiber into the zone of interaction between the jet and the blast, and in this zone or region the additional counter-rotating tornadoes 42a and 42b effect further attenuation of the fiber, which may then be delivered to a collection system, for example in the manner illustrated in FIG. 1, including the use of a chute 19 and collection conveyor 20.

Although the first stage of attenuation which is effected in the flow of the jet itself may be utilized for fiber formation without employment of a blast, such as indicated at 15, for most purposes, it is preferred that the attenuation accomplished by the jets be relied upon only as a preliminary stage of attenuation and that a second stage of attenuation be effected by toration in the zone of interaction of the jet with the blast.

The system described above is of advantage in providing for separation of the major components of the fiberizing equipment, especially in providing for separation of the glass supply means from the principal attenuating blast and also in providing for separation of the means for generating the jets from the means for generating the blast. Separation of the major components is advantageous for a number of reasons, including the fact that the maintenance of the desired temperature of each of the components is more readily achieved where the components are spaced from each other than where they are close to each other and thus tend to effect heat transfer from one component to another. However, it is of importance in such fiberization systems that the streams of the attenuable material be fed in accurately controlled positional relation to the individual zones of interaction in the principal attenuating blast. The system herein disclosed, results in accurate feed of the attenuable material notwithstanding the separation, because the pairs of tornadoes associated with each carrier jet develop in a manner providing for stability of the jet flow. It will be observed that the points of origin or apices of the tornadoes are located on the surface of the cylindrical guide rod 19. The apices of the tornadoes are thus, in effect, "attached" to the cylindrical surface of the guide rod 19 and are therefore stabilized in position. The tornadoes are therefore much more stable than would be the case if the apices were generated in free space. The factors referred to above result in high stability of feed of the glass or other attenuable material into the toration zones in the blast.

Moreover, even some lateral misalignment of the glass bulbs G with relation to the individual jet nozzles 32 will be automatically compensated as a result of the induced air currents associated with the laminar flow area of the jet lying between the pair of upper tornadoes. This aids in stabilizing the feed of the glass into the laminar zone of the jet flow, and this in turn will also increase the stability of the feed of glass by the jets into the toration zones.

FIG. 10 illustrates the three major components, i.e., the means for developing the blast, the means for developing the jet, and the means for introducing the attenuable material, each of these three means being shown fragmentarily in section in the same general manner as in FIG. 5. FIG. 10 also illustrates the cylindrical guiding or deflecting rod 19, and in FIG. 10 symbols or legends have been applied to identify certain dimensions and angles, all of which are referred to in one or another of the tabulations herebelow. Some of these symbols or legends also appear in FIGS. 10a and 10b. The tables give not only appropriate ranges for the dimensions and angles, but also indicate preferred values.

In considering the symbols and legends, reference is first made to the bushing 35 and the devices 36 for the supply of the attenuable material, in connection with which see Table I just below.

TABLE I

| Symbol | (mm) Preferred Value | Range |
|---|---|---|
| $d_T$ | 2 | 1→5 |
| $l_T$ | 1 | 1→5 |
| $l_R$ | 5 | 0→10 |
| $d_R$ | 2 | 1→5 |
| $D_R$ | 5 | 1→10 |

With reference to the jet supply and the cylindrical deflector element 19, see the following table:

TABLE II

| Symbol | (mm, degree) Preferred Value | Range |
|---|---|---|
| $d_J$ | 2 | 0.5→4 |
| $l_J$ | 7 | 1→ |
| $Y_J$ | 5 | 3→7 |
| $D_J$ | 6 | 6→12 |
| $\frac{l_{JD}}{d_J}$ | 0 | +0.25→−0.5 |
| JB | 10 | 0→45 |
| $L_{JD}$ | 4 | 3→8 |

When the axis of the jet emission orifice is tangent to the upper surface of the rod 19, $l_{JD}$ is zero and the negative values of $l_{JD}$ correspond to the case in FIG. 10 where this axis cuts the upper part of the rod.

With regard to the blast, note the following table:

TABLE III

| Symbol | (mm) Preferred Value | Range |
|---|---|---|
| $l_B$ | 10 | 5→20 |

In addition to the foregoing dimensions and angles involved in the three major components of the system, certain interrelationships of those components are also to be noted, being given in the table just below.

TABLE IV

| Symbol | (mm) Preferred Value | Range |
|---|---|---|
| $Z_{JF}$ | 8 | 3→15 |
| $Z_{JB}$ | 17 | 12→30 |
| $X_{BJ}$ | −5 | −12→13 |
| $X_{JF}$ | 5 | 3→8 |

In connection with the symbol $X_{BJ}$, it will be noted that in the illustration of FIG. 10, $X_{BJ}$ is indicated at a negative value.

As indicated hereinabove in the embodiment of FIGS. 1 to 10b, it is contemplated that the carrier or secondary jets be placed sufficiently close to each other so that they spread and impinge upon each other in order to develop the pairs of tornadoes in each carrier jet. Any convenient number of fiberizing centers may be established, each center comprising a delivery device for the attenuable material and an associated jet, and since each carrier jet must impinge upon another jet at each side thereof, it will be seen that the number of jets must include two more than the total number of the delivery means for the attenuable material, the two "extra" jets being positioned outboard at the opposite ends of the series of jets.

The term "feed orifice" for the attenuable material is to be understood broadly and can mean, either an isolated orifice, a slot associated with a row of jets, or a series of orifices situated, for example, at the end of glass delivery devices. When a slot is used it is situated transversely of the blast, and the material coming from the slot is divided into a series of cones and strands by the action of the secondary jets themselves. There again, and for the same reasons as before, two supplementary jets are placed at the ends of the row of jets.

The number of fiberizing centers may run up to as many as 150, but in a typical installation where glass or some similar thermoplastic material is being fiberized, a bushing having 70 delivery devices or orifices is appropriate. In such a case, there would necessarily be 72 jets.

In connection with the operating conditions, it is first pointed out that the conditions of operating the system according to the present invention will vary in accordance with a number of factors, for example in accordance with the characteristics of the material being attenuated.

As above indicated, the system of the present invention is capable of use in the attenuation of a wide range of attenuable materials. In the attenuation of glass or other inorganic thermoplastic materials, the temperature of the bushing or supply means will of course vary according to the particular material being fiberized. The temperature range for materials of this general type may fall between about 1400° and 1800° C. With a typical glass composition, the bushing temperature may approximate 1480° C.

The pull rate may run about 20 to 150 kg/hole per 24 hours, typical values being from about 50 to about 80 kg/hole per 24 hours.

Certain values with respect to the jet and blast are also of significance, as indicated in tables just below in which the following symbols are used.

T = Temperature
p = Pressure
V = Velocity
ρ = Density

TABLE V

| Symbol | JET SUPPLY Preferred Value | Range |
|---|---|---|
| $p^J$ (bar) | 2.5 | 1→4 |
| $T_J$ (° C) | 20 | 10→1500 |
| $V_J$ (m/sec) | 300 | 200→900 |
| $(\rho V^2)$ (bar) | 2.1 | 0.8→3.5 |

TABLE VI

| Symbol | BLAST Preferred Value | Range |
|---|---|---|
| $p^B$ (mbar) | 95 | 30→250 |
| $T_B$ (° C) | 1450 | 1350→1800 |
| $V_B$ (m/s) | 320 | 200→550 |
| $(\rho V^2)$ (bar) | 0.2 | 0.06→0.5 |

Figure 12:
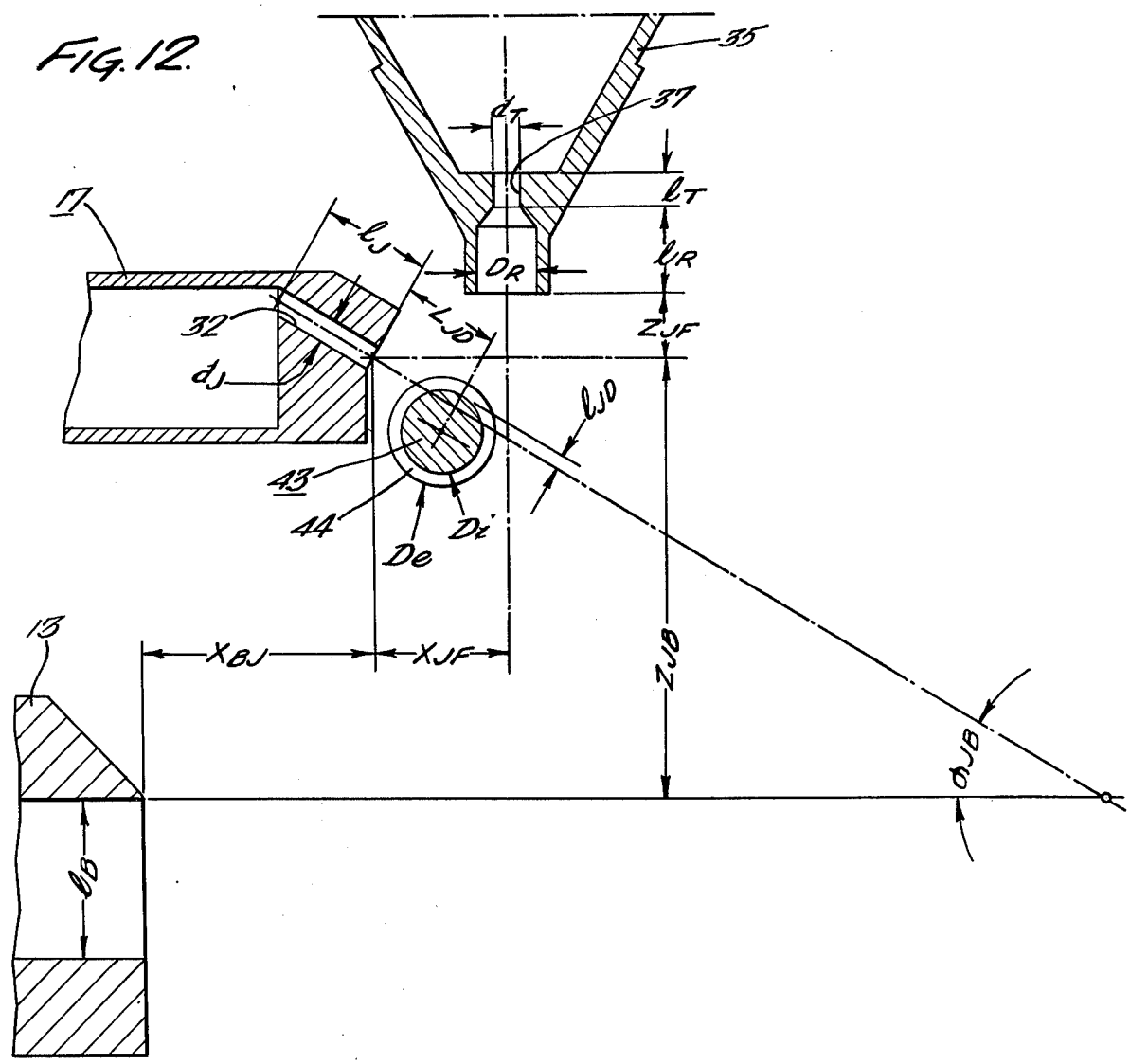
Figure 12A:
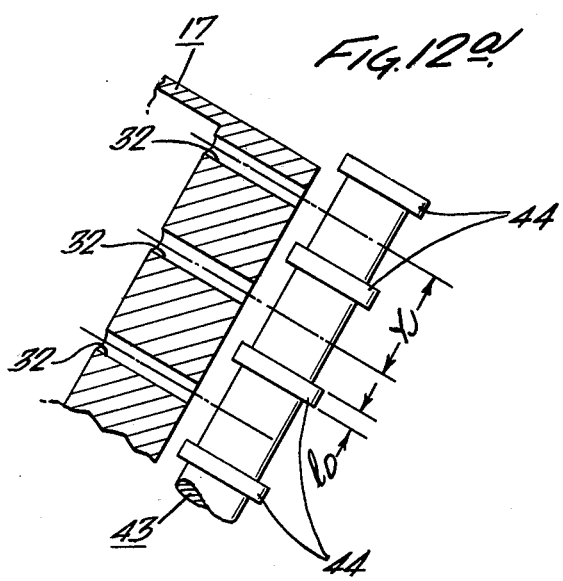
FIG. 12a is a fragmentary sectional view illustrating jet spacing and also showing the alternative form of jet deflecting means and indicating certain dimensions to be taken into account.
Figure 12B:
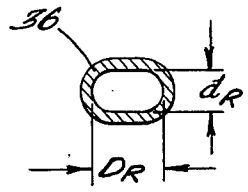

Turning now to the embodiment illustrated in FIGS. 11 to 12b, it will be seen that the showing of FIG. 11 is similar to FIG. 6, although in FIG. 11, the illustration is more fragmentary, the blast 15 being completely omitted and the illustration of the jet flow being shortened. This embodiment is similar to the first embodiment, with one principal difference. Thus, in FIG. 11, the deflecting or guiding structure or element comprises a cylindrical rod or element 43, preferably of circular cross section, having circumferential flanges 44, which subdivide the length of the rod 43 into a plurality of channels for the upper and lower portions of the jet flow.

In the embodiment of FIG. 11, the action is similar to that described above in connection with the first embodiment except that, instead of the generation of pairs of tornadoes in consequence of impingement of adjoining jets upon each other, the pairs of tornadoes are generated by impingement of the spreading jets against the lateral side walls of the flanges 44. These flanges may therefore serve to further stabilize the apices or points of origin of the tornadoes, this being important for reasons brought out above, and particularly in order to provide for accuracy in feed of the streams of attenuable material into the individual zones of interaction of the jets with the blast. A high degree of accuracy of feed is provided in this way, notwithstanding considerable separation of the major components of the fiberizing system.

It is also pointed out in connection with the embodiment in FIG. 11, that since development of the pairs of tornadoes associated with the carrier jet does not require impingement of adjoining jets upon each other, the individual fiberizing centers, including the carrier jets, may be laterally spaced from each other greater distances than would be practicable where impingement of the jets upon each other is relied upon for development of the tornadoes. This feature of the arrangement of FIG. 11 is of advantage in the handling or fiberization of certain types of material with which it is preferred to maintain greater spacing between the delivery orifices for the attenuable material.

Turning now to FIGS. 12 to 12b, which identify dimensions and dimensional relationships of the major components of the fiberizing system of the embodiment shown in FIG. 11, it is first noted that most of the values are the same as given above in Tables I to IV inclusive in connection with the first embodiment. The diameter $D_i$ of the rod 43 may be the same as the rod 19 of the first embodiment as indicated in Table II. It is here to be noted that the flanges 44 may be dimensioned as indicated in Table VII just below.

TABLE VII

| Symbol | (mm) Preferred Value | Range |
|---|---|---|
| $D_e$ | 10 | 10→16 |
| $1_D$ | 2 | 0.5→ |

The spacing of the jet orifice 32 (identified in FIGS. 10a and 12a as $Y_J$ and also in Table Ii as $Y_j$) is preferably somewhat greater in the second embodiment than in the first embodiment, because of the provision of the flanges 44 on the deflector rod and because of the thicknexx thereof. Provided the flanges are appropriately positioned on the deflector rod, there is no upper limit to the spacing between the jets, since the tornadoes are generated by impingement of the spreading jets upon the side walls of the flanges, rather than by impingement of adjoining jets upon each other as in the first embodiment. In a preferred installation, the spacing of the jets and of the flanges will correspond, which means that two adjacent jets are spaced by a single flange having moderate thickness. This spacing may have a value anywhere above about 5 mm.

In other respects, the dimensions and dimensional relationships in the second embodiment, as illustrated in FIG. 12 to 12b, are the same as those illustrated in FIGS. 10 to 10b and described above with respect to Tables I to IV inclusive.

The second embodiment above referred to is of particular advantage in situations where it is desired to maintain substantial spacing between adjoining fiberizing centers. In addition, the second embodiment has the further distinctive advantage that because of the use of the flanges on the deflecting element, the point of origin or apex of each tornado is still further stabilized as compared with the first embodiment. Thus, in the second embodiment the point of original of each tornado is not only stabilized in a given circumferential position on the guide rod (as in the first embodiment), but is also stabilized in a given position axially of the surface of the guide rod, i.e., at the adjacent side wall of the flange.

In connection with both of the embodiments which are shown respectively in FIGS. 1 to 10b and in FIGS. 11 to 12b, it is observed that the position of the secondary jet orifice 32 in relation to the jet guiding tube or rod (19 in the first embodiment and 43 in the second embodiment) is such that the jet flow is divided, with one portion thereof flowing around one side of the rod and the other flowing around the other side of the rod. This positional relationship is identified as the distance $l_{JD}$, which is indicated in FIGS. 10 and 12 and is also referred to in Table II.

It would theoretically be possible to position each jet so that the entire jet flow passed on one side of the rod, but this is not preferred principally because it is desired to establish a relationship which will achieve maximum stability with respect to the angle at which the jet flow will leave the surface of the rod. If the entire jet flow passed around one side of the rod, the point at which the jet flow would leave the surface of the rod, and thus the angle of deflection of the jet, would not be stable and would fluctuate somewhat, particularly in consequence of the effects of stray air currents. This would introduce an element of instability which would result in irregularity in the attenuating action of the jet flow and of the toration taking place in the zone of interaction between the jet and the blast.

By positioning the jet orifice to provide division of the flow with portions at both sides of the rod, the point of confluence of the two portions of the flow and the consequent position and angle at which the jet flow leaves the rod is highly stable, thereby stabilizing the feed of the attenuable material, and also the attenuation itself not only in the influence of the pairs of tornadoes within the jet, but also in the zone of interaction of the jet with the blast.

Preferably, the value of $l_{JD}$ is selected to provide for a larger portion of the jet flow passing over the surface of the rod at the side thereof presented toward the stream of attenuable material, rather than at the opposite side of the rod. This unequal distribution of the jet flow at the two sides of the rod provides pairs of tornadoes 40a and 40b adjacent to the feed of the attenuable material which are larger and more intense than the pairs of tornadoes 41a and 41b which are developed in the portion of the flow around the opposite side of the rod. As already indicated above, this is advantageous because it is desired that the action of the pairs of tornadoes 40a and 40b predominate in the attenuation of the fiber.

We claim:

1. Apparatus for forming fibers from attenuable material comprising means for establishing a gaseous blast, means for establishing a series of spaced side-by-side gaseous jets each of smaller cross section than the blast and directed in paths having a predetermined initial relation to the path of the blast, means for deflecting the flow of the jets to alter the paths of the jets from said predetermined paths into paths intersecting the path of the blast and to cause lateral spreading of the jets, the deflecting means comprising a deflector having a convexly curved surface positioned in the path of the jets and providing for deflection of the jets by Coanda effect, the jets and the deflecting means being arranged to provide for impingement of adjoining deflected jets upon each other in zones intermediate said predetermined paths and thereby generate spaced tornadoes and the jets having sufficient kinetic energy to cause the deflected jets to penetrate the blast, and means for delivering a stream of attenuable material into the influence of each jet in a region along the path thereof between said tornadoes.

2. Apparatus as defined in claim 1 in which the deflector comprises a cylindrical element.

3. Apparatus as defined in claim 2 in which the cylindrical element is proportioned and positioned with relation to the jets to provide for division of the jet flow into portions extended around opposite sides of the cylindrical element.

4. Apparatus as defined in claim 1 in which the curved surface of the deflector has spaced projecting flanges defining channels for the gas flow of the respective jets.

5. Apparatus as defined in claim 4 in which the deflector comprises a cylindrical element and in which the flanges extended around said cylindrical element, the cylindrical element being proportioned and positioned with relation to the jets to provide for division of the jet flow into portions extended around opposite sides of the cylindrical element.

6. Apparatus for forming fibers from attenuable material comprising means for establishing a series of spaced gaseous jets directed in side-by-side generally parallel paths, means for deflecting the jets from said paths to alter the paths thereof and to cause lateral spreading of the jets, the deflecting means comprising a deflector having a convexly curved surface positioned in the path of the jets and providing for deflection of the jets by Coanda effect, the jets and the deflecting means being arranged to provide for impingement of adjoining deflected jets upon each other in zones intermediate the jets and thereby generate spaced tornadoes, and means for delivering a stream of attenuable material into the influence of each jet in a region along the path thereof between said tornadoes.

7. Apparatus for forming fibers from attenuable material comprising means for establishing a gaseous blast, means for establishing a series of spaced side-by-side jets each of smaller cross section than the blast and directed in paths having a predetermined initial relation to the path of the blast, means for deflecting the flow of the jets to alter the paths of the jets from said predetermined paths into paths intersecting the path of the blast and to cause lateral spreading of the jets, the deflecting means comprising a deflector having a convexly curved surface positioned in the path of the jets and providing for deflection of the jets by Coanda effect, and means for delivering a stream of attenuable material into the influence of each jet in a region of the flow path thereof over the curved surface of the deflector.

8. Apparatus as defined in claim 7 in which the jets are positioned sufficiently close to each other to provide for impingement of adjoining jets upon each other and thereby generate spaced but converging tornadoes and the jets having sufficient kinetic energy to cause the deflected jets to penetrate the blast, the means for delivering the streams of attenuable material being positioned to deliver the streams to the jets in regions between the spaced tornadoes upstream of the zones of convergence thereof.

9. Apparatus as defined in claim 7 in which the curved surface of the deflector has spaced projecting flanges defining channels for the gas flow of the respective jets and against which the spreading jets impinge and thereby generate spaced but converging tornadoes and the jets having sufficient kinetic energy to cause the deflected jets to penetrate the blast, the means for delivering the streams of attenuable material being positioned to deliver the streams to the jets in regions between the spaced tornadoes upstream of the zones of convegence thereof.

10. Equipment for making fibers from attenuable material comprising supply means for the attenuable material having a delivery orifice positioned for downward delivery of a stream of the material, means for establishing a gaseous blast in a position spaced below the supply means, means for establishing a gaseous jet including an orifice discharging a jet of smaller cross section than that of the blast, the jet being directed in a direction transverse to and toward the stream of attenuable material, and jet guiding means comprising a curvilinear guide element having a convexly curved guide surface with an upstream portion adjacent the jet delivered from the jet orifice and further with a downstream portion extended transverse to the blast to guide the jet in a path from which the jet approaches and penetrates the blast through the boundary thereof presented toward the stream delivery orifice and thereby develop a zone of interaction of the jet with the blast, said delivery orifice being positioned with relation to the jet and blast to deliver the stream of attenuable material into the influence of the jet and thence to said zone of interaction.

11. Equipment for making glass fibers from molten glass comprising glass supply means having a delivery orifice positioned for downward delivery of a stream of molten glass, means for establishing a gaseous blast spaced below the glass delivery orifice, means for establishing a gaseous jet including an orifice discharging a jet of small cross section than that of the blast, the jet orifice being located in spaced relation to the glass orifice in a direction upstream and downstream of the blast and in which the jet orifice is positioned to discharge the jet in a direction transverse to and toward the glass stream, and jet guiding means having a convexly curved surfaced with an upstream portion adjacent the jet delivered from the jet orifice and further with a downstream portion extended transverse to the blast, the jet being of higher kinetic energy per unit of volume than the blast and penetrating the blast to develop a zone of interaction of the jet with the blast, and the glass delivery orifice being positioned with relation to the jet and blast so that the stream of molten glass is introduced into the influence of the guided jet and thence into said zone of interaction.

12. Equipment as defined in claim 11 in which the jet orifice is located in a position which, with relation to the direction of flow of the blast, is upstream of the position of the glass stream.

13. Equipment for making fibers from attenuable material comprising supply means having a delivery orifice positioned for downward delivery of a stream of attenuable material, means for establishing a gaseous blast spaced below the delivery orifice, and means for establishing and guiding a gaseous jet including a jet nozzle having an orifice proportioned to discharge a jet of smaller cross section than that of the blast and oriented to direct the jet in a direction toward the region of the stream of attenuable material and including guide means having a curved surface imposing a Coanda flow effect upon the jet and thereby cause the jet to follow a path curving downwardly toward the blast, the jet being of sufficient kinetic energy to penetrate the blast and develop a zone of interaction of the jet and blast, and the delivery orifice being positioned to deliver a stream of the attenuable material to the jet in the region of said Coanda flow effect.

14. Equipment for making fibers from attenuable material comprising supply means for the attenuable material having a delivery orifice positioned for downward delivery of a stream of the material, means for establishing a gaseous blast, means for establishing a gaseous jet including an orifice discharging a jet of smaller cross section than that of the blast in a direction toward the stream of attenuable material, and means for altering the path of the jet including an element interposed in the path of the jet as discharged from said orifice between the jet orifice and the stream of attenuable material, said interposed element having a surface convexly curved about an axis transverse to the stream of attenuable material and to the axis of the jet orifice, said curved surface being positioned to impose a Coanda effect upon the jet causing the jet to follow a path curved toward the blast, and the jet being of sufficient kinetic energy to penetrate the blast and develop a zone of interaction of the jet and blast, the delivery orifice for the attenuable material being positioned to deliver the stream of attenuable material to the jet in the region of the convexly curved surface of said element.

15. Equipment as defined in claim 14 in which the axis of curvature of said curved surface is positioned generally horizontally and in which the axis of the jet is directed toward the curved surface of said interposed element in the upper region of said surface.

16. Equipnent for making fibers from attenuable material comprising supply means for the attenuable material having a series of spaced delivery orifices positioned for downward delivery of streams of the material, means for establishing gaseous jets comprising a series of orifices respectively aligned with individual delivery orifices for the attenuable material, a jet guiding element having a surface in the flow of the jets, the section of said element in a plane parallel to the axes of the jets and streams of material having a portion which is convexly curved and is positioned to intercept the streams of attenuable material.

17. Equipment as defined in claim 14 in which said element comprises a cylindrical member with its axis extended generally horizontally.

18. Equipment as defined in claim 14 in which the interposed element is provided with spaced flanges projecting from said convexly curved surface to provide a channel for the jet in its curved path.

19. Apparatus for forming fibers from attenuable material comprising means for establishing a series of spaced gaseous jets directed in side-by-side generally parallel paths, guiding means in the path of flow of the jets providing for spreading of the jets, the guiding means comprising an element having a convexly curved surface positioned in the path of the jets and providing for impingement of adjoining jets upon each other in zones intermediate the jets and thereby generate spaced tornadoes, and means for delivering a stream of attenuable material into the influence of each jet in a region along the path thereof between said tornadoes.

20. Equipment as defined in claim 19 and further including means for developing a gaseous blast of larger cross section than the jet and directed in a path intercepting the jet downstream of the jet guiding means.

* * * * *

UNITED STATES PATENT AND TRADEMARK OFFICE
CERTIFICATE OF CORRECTION

PATENT NO. : 4,145,203
DATED : March 20, 1979
INVENTOR(S) : Marcel Levecque, Jean A. Battigelli and Dominique Plantard It is certified that error appears in the above-identified patent and that said Letters Patent are hereby corrected as shown below:

Column 9, line 57 - "$(\rho V_2)$" should read --$(\rho v^2)$--.

Column 11, line 12 - "original" should read --origin--.

Signed and Sealed this

Twenty-sixth Day of June 1979

[SEAL]

Attest:

RUTH C. MASON
Attesting Officer

DONALD W. BANNER
Commissioner of Patents and Trademarks